United States Patent
Joshi et al.

(10) Patent No.: US 11,293,374 B2
(45) Date of Patent: Apr. 5, 2022

(54) PISTON BOWL GEOMETRIES FOR INTERNAL COMBUSTION ENGINES

(71) Applicant: FEV GmbH, Aachen (DE)

(72) Inventors: Satyum Joshi, Farmington Hills, MI (US); Erik Koehler, Birmingham, MI (US); Mufaddel Z. Dahodwala, West Bloomfield, MI (US); Michael Franke, Rochester Hills, MI (US); Nitisha Ahuja, Auburn Hills, MI (US)

(73) Assignee: FEV GMBH, Aachen (DE)

( * ) Notice: Subject to any disclaimer, the term of this patent is extended or adjusted under 35 U.S.C. 154(b) by 0 days.

(21) Appl. No.: 16/944,897

(22) Filed: Jul. 31, 2020

(65) Prior Publication Data

US 2022/0034279 A1    Feb. 3, 2022

(51) Int. Cl.
*F02F 3/28*     (2006.01)
*F02B 23/06*    (2006.01)

(52) U.S. Cl.
CPC .......... *F02F 3/28* (2013.01); *F02B 23/0624* (2013.01); *F02B 23/0651* (2013.01); *F02B 23/0678* (2013.01)

(58) Field of Classification Search
CPC .......... F02B 23/0624; F02B 23/0627; F02B 23/0651; F02B 23/0678; F02B 23/0696; F02F 3/28; F02F 3/285
See application file for complete search history.

(56) References Cited

U.S. PATENT DOCUMENTS

| | | | | |
|---|---|---|---|---|
| 5,215,052 A | * | 6/1993 | Augustin | F02B 23/0669 123/276 |
| 8,424,506 B2 | * | 4/2013 | Hasegawa | F02B 23/0624 123/279 |
| 9,869,270 B1 | * | 1/2018 | Anders | F02B 23/0624 |

(Continued)

FOREIGN PATENT DOCUMENTS

| | | | | |
|---|---|---|---|---|
| DE | 1242400 B | * | 6/1967 | ..... F02B 23/0684 |
| EP | 0604223 A1 | | 6/1994 | |

(Continued)

OTHER PUBLICATIONS

DE 1242400 B English machine translation provided by ESPACENET of claims (Year: 2021).*

(Continued)

*Primary Examiner* — Michael A Kessler
(74) *Attorney, Agent, or Firm* — Dinsmore & Shohl LLP

(57) ABSTRACT

A piston for an internal combustion engine is provided. The piston includes a piston bowl defined by a floor surface and a rim wall extending from an outer periphery of the floor surface in a system vertical direction to circumferential surround the floor surface. The piston bowl includes a center portion that extends above the floor surface. A plurality of protrusions extend radially from the center portion and from the floor surface and are spaced apart such that a spray guide is formed between each of the spaced apart plurality of protrusions. Each of the plurality of protrusions and spray guides are tapered so to terminate prior to the rim wall such that a continuous radius portion is formed from a portion of (Continued)

the rim wall and a portion of the floor surface beyond a respective terminating portion of each of the plurality of protrusions and spray guides.

10 Claims, 10 Drawing Sheets

(56) References Cited

U.S. PATENT DOCUMENTS

| | | |
|---|---|---|
| 2010/0258076 A1 | 10/2010 | Eismark et al. |
| 2011/0253094 A1 | 10/2011 | Rothbauer et al. |
| 2011/0253095 A1 | 10/2011 | Rothbauer et al. |
| 2013/0036903 A1* | 2/2013 | Daniels ................ F02B 75/282 92/172 |
| 2013/0047950 A1 | 2/2013 | Eismark et al. |
| 2019/0003372 A1 | 1/2019 | Eismark |
| 2019/0186342 A1 | 6/2019 | Zoeller |
| 2020/0149465 A1* | 5/2020 | Kurtz ................ F02B 23/0669 |
| 2020/0232416 A1* | 7/2020 | Primus ............... F02B 23/0678 |

FOREIGN PATENT DOCUMENTS

| | | | | |
|---|---|---|---|---|
| EP | 1605147 A1 | * | 12/2005 | .......... F02B 23/0651 |
| EP | 2204559 A1 | * | 7/2010 | .......... F02B 23/0687 |
| EP | 3440230 A1 | | 2/2019 | |
| FR | 1078961 A | * | 11/1954 | .......... F02B 23/0603 |
| FR | 2818318 A1 | * | 6/2002 | .............. F02F 1/002 |
| GB | 570968 A | * | 7/1945 | ................ F02F 3/28 |
| JP | 61200322 A | * | 9/1986 | .......... F02B 23/0651 |
| JP | 62139921 A | * | 6/1987 | .......... F02B 23/0672 |
| JP | 62240419 A | * | 10/1987 | .......... F02B 23/0666 |
| WO | 17155519 A1 | | 9/2017 | |

OTHER PUBLICATIONS

DE 1242400 B English machine translation provided by ESPACENET of description (Year: 2021).*
JP 61200322 A English machine translation provided by ESPACENET of claims (Year: 2021).*
JP 61200322 A English machine translation provided by ESPACENET of description (Year: 2021).*
Abstract for JP 61200322 A (Year: 2021).*

* cited by examiner

PISTON BOWL GEOMETRIES FOR INTERNAL COMBUSTION ENGINES

BACKGROUND

Field

The present disclosure relates to compression ignition engines and, more particularly, to piston bowl geometries used in compression ignition engines to reduce emissions.

Technical Background

Petroleum-based fuels are used to power the vast majority of transportation vehicles, such as automobiles, trucks, trains, and the like. For example, petroleum-based fuels, which is relatively inexpensive and widely available for users, is utilized to power the internal combustion engines of automobiles throughout the world. However, the combustion of petroleum-based fuels may cause residual soot particles and nitric oxide emissions, which may be undesirable for a number of reasons. For example, in a diesel process, the petroleum-based fuel is injected directly into the cylinder and is subjected to increased pressure and temperature during the ignition process, which causes a mixture-controlled diffusion flame during combustion. The combustion causes a cylinder to expand which causes a piston to move. In these traditional internal combustion engines, a shape of a piston bowl causes undesirable residual soot particles and nitric oxide emissions during the combustion of the petroleum-based fuels. As such, a need for a differently shaped piston bowl to reduce or eliminate undesirable residual soot particles and nitric oxide emissions that occur during the combustion of the petroleum-based fuels exists.

BRIEF SUMMARY

In one embodiment, a piston for an internal combustion engine is provided. The piston includes a piston bowl defined by a floor surface and a rim wall extending from an outer periphery of the floor surface in a system vertical direction to circumferential surround the floor surface. The piston bowl includes a center portion and a plurality of protrusions. The center portion extends above the floor surface in the system vertical direction. The plurality of protrusions extend radially from the center portion and from the floor surface. Each of the plurality of protrusions are spaced apart such that a spray guide is formed between each of the plurality of protrusions. Each of the plurality of protrusions and spray guides are tapered so to terminate prior to the rim wall such that a continuous radius portion is formed from a portion of the rim wall and a portion of the floor surface beyond a respective terminating portion of each of the plurality of protrusions and spray guides. Each of the plurality of protrusions and spray guides direct a fuel into the continuous radius portion.

These and additional features provided by the embodiments described herein will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1A:
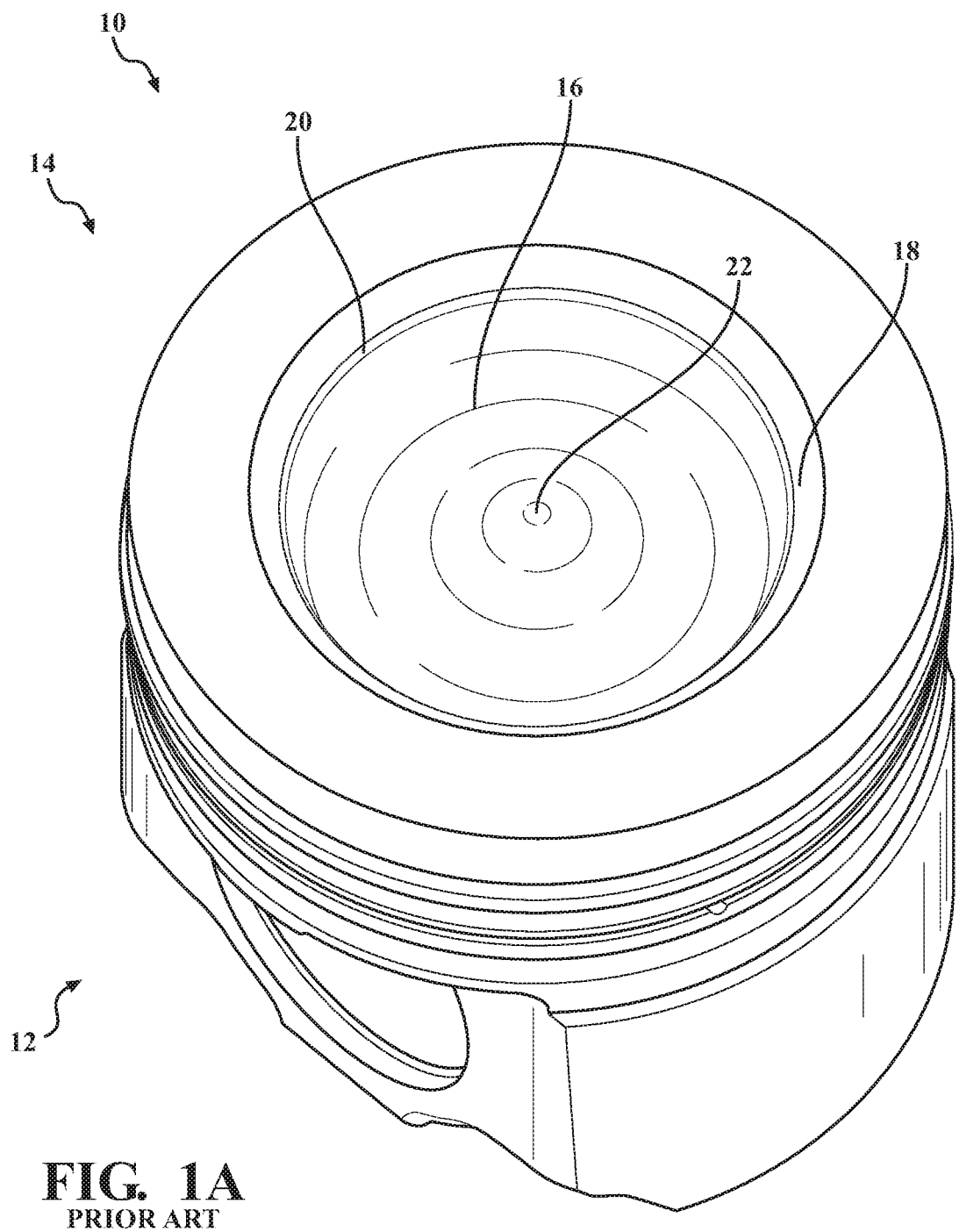
FIG. 1A schematically depicts an isolated perspective view of a prior art piston bowl of a piston of an internal combustion engine, according to one or more embodiments shown and described herein.

Embodiments described herein are generally directed to internal combustion engine systems that include an internal combustion engine with a piston. The piston includes a piston crown having a piston bowl. The piston bowl includes a floor surface and a rim wall extending from an outer periphery of the floor surface in a system vertical direction to circumferential surround the floor surface. Further, the piston bowl includes a center portion that extends above the floor surface in the system vertical direction. A plurality of protrusions extend radially from the center portion and from the floor surface in which each of the plurality of protrusions are spaced apart to form a star shape. A spray guide is formed between each of the spaced apart plurality of protrusions. A continuous radius portion is formed from a portion of the rim wall and a portion of the floor surface beyond a respective terminating portion of each of the plurality of protrusions and spray guides.

As such, this arrangement of the piston bowl provides for reduced particulate material emissions in high compression ratios in direct injection applications compared to conventionally known piston bowls by providing an increased bowl volume due to the size of the continuous radius portion, increasing a length from the center portion to the continuous radius portion via the plurality of protrusions and spray guides, and the continuous radius is unimpeded so that a swirl motion of the fuel may occur in the continuous radius portion. As such, the arrangement of the piston bowl provides more air volume to be moved in front of the fuel spray during a combustion process for better combustion and the plurality of protrusions and spray guides prevent particulate matter at different compression ratio for a given spray angle. That is, in conventional combustion systems, the air between the fuel spray plumes is not utilized effectively. The arrangement of the piston bowl described herein replaces underutilized air pocket between the spray plumes of conventional piston bowls with piston material to achieve higher compression ratios without increase particulate matter emissions. Further, at same compression ratio, moving the air volume from the center portion of the piston bowl towards the periphery of the bowl during a combustion process also helps achieve better air utilization while reducing particular matters and generating Gross Indicated Specific Fuel Consumption (GISFC) benefit. Further, the geometric arrangement of the piston bowl described herein provides a GISFC benefit with lower particulate matter at high compression ratios without an injection spray optimization.

As used herein, the term "system longitudinal direction" refers to the forward-rearward direction of the vehicle (i.e., in the +/− system X-direction as depicted). The term "system lateral direction" refers to the cross-vehicle direction of the vehicle (i.e., in the +/− system Y-direction as depicted), and is transverse to the vehicle longitudinal direction. The term "system vertical direction" refers to the upward-downward direction of the vehicle (i.e., in the +/− system Z-direction as depicted). As used herein, "upper" and "above" are defined as the positive Z direction of the coordinate axis shown in the drawings. "Lower" and "below" are defined as the negative Z direction of the coordinate axis shown in the drawings.

Figure 1B:
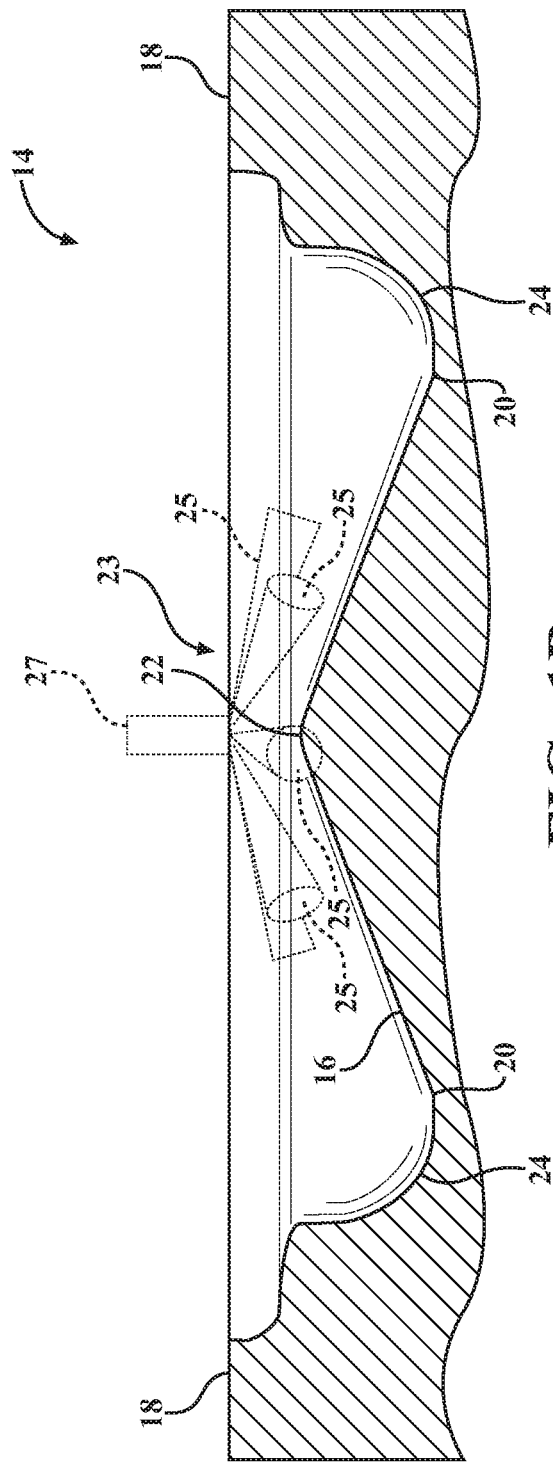
FIG. 1B schematically depicts an isolated cross-sectional view of the prior art piston bowl of FIG. 1A with a spray plume, according to one or more embodiments shown and described herein.

Now referring to FIGS. 1A-1B, a prior art piston 10 with a piston crown 12 is schematically depicted. The piston crown 12 includes a piston bowl 14. The piston bowl 14 includes a floor surface 16 and a rim wall 18 extending from an outer periphery 20 of the floor surface 16 in a system vertical direction to circumferential surround the floor surface 16. Further, the piston bowl 14 includes a center portion 22 that extends above the floor surface 16 in the system vertical direction. The floor surface 16 is sloped or tapers from the center portion 22 in a direction towards the rim wall 18 such that a radius portion 24 is formed at the transition between the floor surface 16 and the rim wall 18.

In operation, a fuel 23 is injected from an injector 27. The fuel 23 is injected is a pattern, such as a plurality of spaced apart plumes 25 that impinge onto the center portion 22 and the floor surface 16 and each of the spray plumes 25 follow the slope of the floor surface 16 into the radius portion 24. Air between the spray plumes 25 is left or remains at the center portion 22 and/or on the floor surface 16 near the center portion 22. As such, in prior art, or in the conventional piston bowl 14, the air pocket between spray plumes 25 is not well utilized resulting in the air pocket between fuel sprays 23 to generate high soot regions and ultimately undesired particulate matter emissions.

Figure 2:
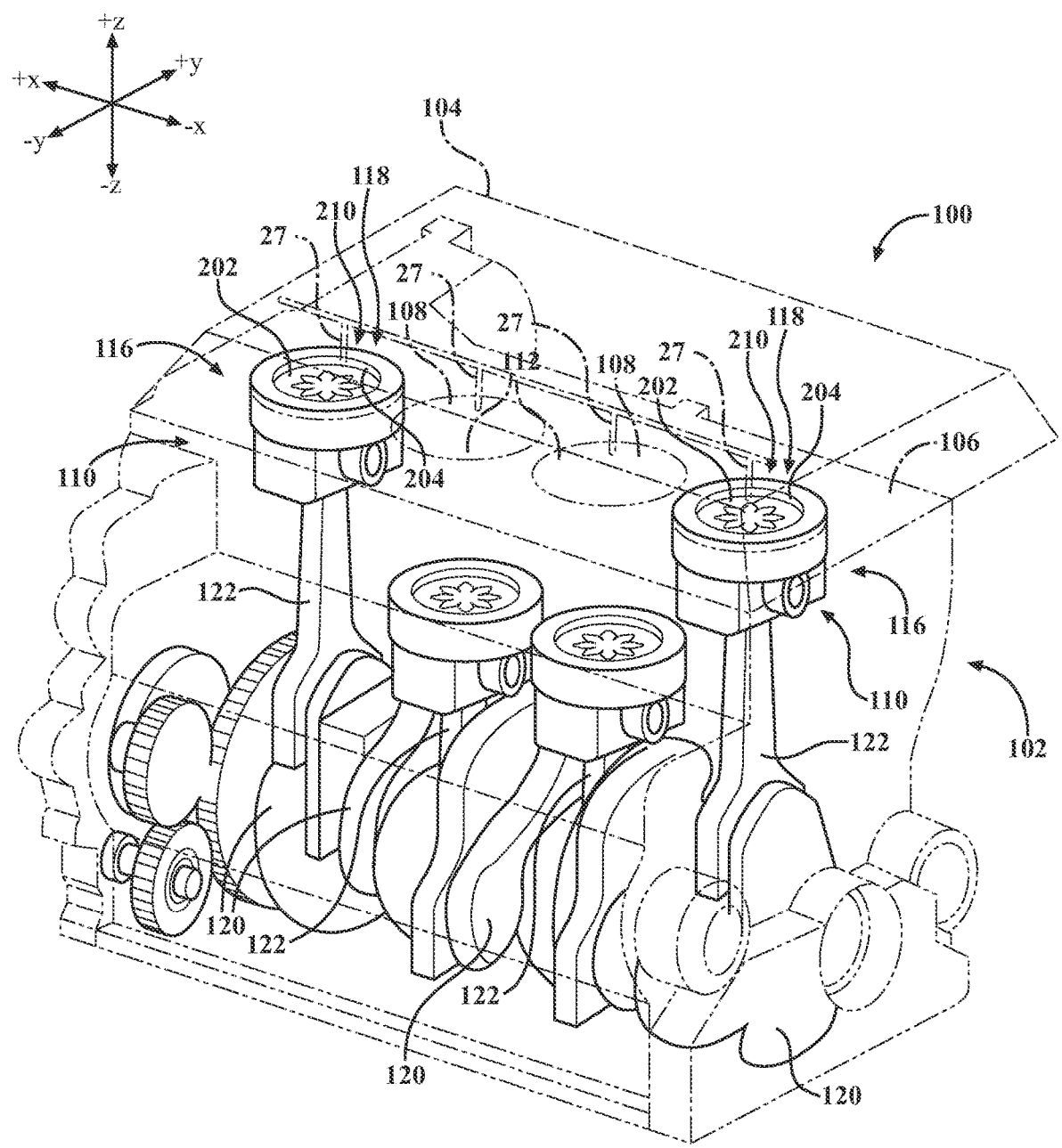
FIG. 2 schematically depicts an internal combustion engine system, according to one or more embodiments shown and described herein.
Figure 7:
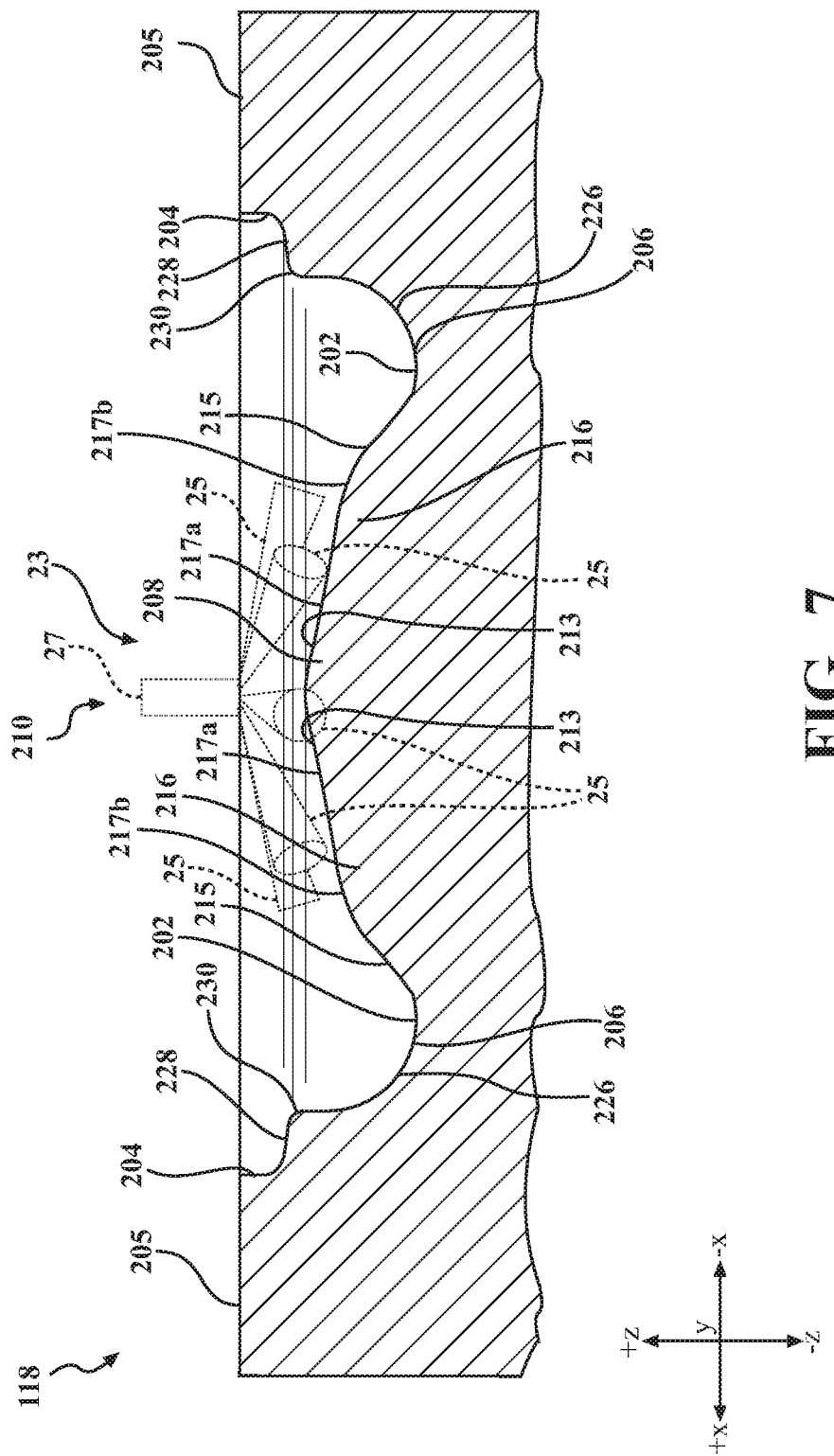
FIG. 7 schematically depicts a cross-sectional view of the piston bowl of the piston crown of the internal combustion engine system of FIG. 4 taken from line 6-6 with a spray plume, according to one or more embodiments shown and described herein.

Now referring to FIG. 2, an internal combustion engine system 100 is schematically depicted. The internal combustion engine system 100 generally includes an internal combustion engine 102 having a cylinder head 104 engaged with a block 106. The block 106 generally defines one or more sidewalls 108 that are engaged with the cylinder head 104. In embodiments, the internal combustion engine 102 includes a piston 110 positioned at least partially within the one or more sidewalls 108. The piston 110, the cylinder head 104, and the one or more sidewalls 108 at least partially define a combustion chamber 112 in which the fuel spray 23 dispended form an injector 27 is combusted. In embodiments, the piston 110 is movable along the one or more sidewalls 108 between a top dead center position and a bottom dead center position to change a volume of the combustion chamber 112 such that a fuel 23 (FIG. 7) is dispersed into the combustion chamber 112 at a predefined interval of movement of the piston 110, as described in greater detail herein. In some embodiments, the piston 110 may include a piston crown 116 that includes a piston bowl 118 that faces the cylinder head 104. It should be appreciated that the piston bowl 118 includes geometry suitable for compression ignition, as discussed in greater detail herein.

In embodiments, the piston 110 is coupled to a crankshaft 120. For example in the embodiment depicted in FIG. 2, the piston 110 is coupled to the crankshaft 120 through a connecting rod 122. In operation, movement of the piston 110 within the combustion chamber 112 is converted into rotational movement of the crankshaft 120. In embodiments in which the internal combustion engine 102 is the engine of a vehicle, rotational movement of the crankshaft 120 may drive one or more wheels of the vehicle to provide the vehicle with mobility.

Figure 5:
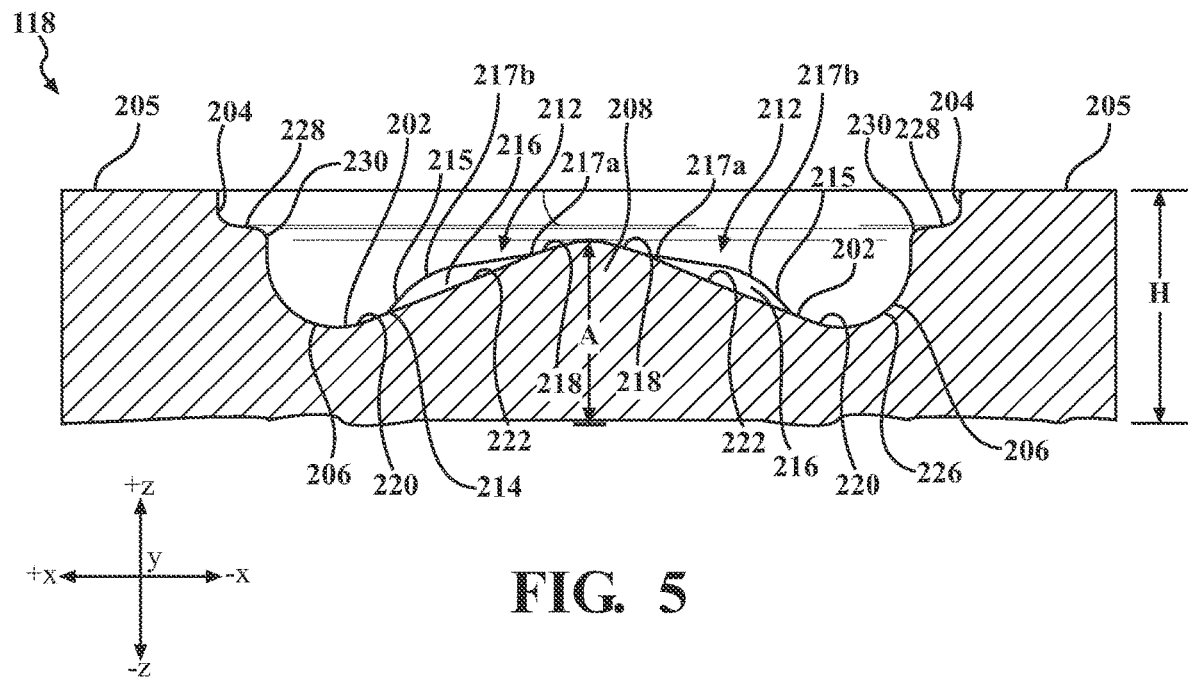
FIG. 5 schematically depicts a cross-sectional view of the piston bowl of the internal combustion engine system of FIG. 4 taken from line 5-5, according to one or more embodiments shown and described herein.
Figure 6:
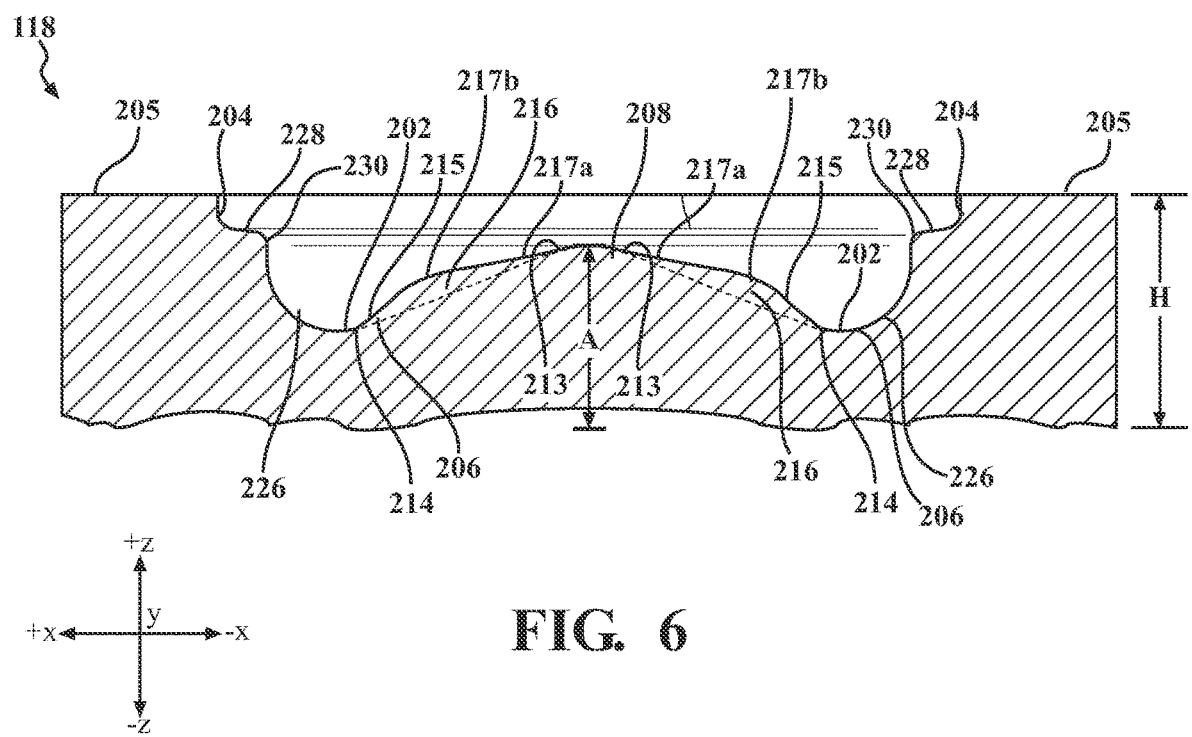
FIG. 6 schematically depicts a cross-sectional view of the piston bowl of the internal combustion engine system of FIG. 4 taken from line 6-6, according to one or more embodiments shown and described herein.

Now referring to FIGS. 2-7, the geometry and operation of the piston bowl 118 will be further described. The piston bowl 118 includes a floor surface 202. A rim wall 204 extends from an outer periphery portion 206 of the floor surface 202 in the system vertical direction (i.e., in the +/−Z direction) to circumferential surround the floor surface 202. The rim wall 204 includes an upper surface 205 that is opposite of the floor surface 202. In some embodiments, the rim wall 204 is continuous to circumferential surround the floor surface 202 as a unitary member. In other embodiments, the rim wall 204 is continuous to circumferential surround the floor surface 202 as a plurality of segmented members. Further, in some embodiments, the rim wall 204 extends from the outer periphery portion 206 of the floor surface 202 in the system vertical direction (i.e., in the +/−Z direction) a uniform height H, as best shown in FIGS. 5-6. In other embodiments, the rim wall 204 extends from the outer periphery portion 206 of the floor surface 202 in the system vertical direction (i.e., in the +/−Z direction) an irregular height. That is, some portions of the rim wall 204 may extend from the outer periphery portion 206 of the floor surface 202 in the system vertical direction (i.e., in the +/−Z direction) at varying or different heights.

In some embodiments, the outer periphery portion 206 of the floor surface 202 is generally circular in shape. In other embodiments, the outer periphery portion 206 of the floor surface 202 may be other shapes such as square, rectangular, hexagonal and the like. Further, it should be appreciated that the outer periphery portion 206 of the floor surface 202 may be any regular or irregular shape.

The piston bowl 118 includes a center portion 208 that extends above the floor surface 202 in the system vertical direction (i.e., in the +/−Z direction). In some embodiments, the center portion 208 is piston material that is raised or elevated in the system vertical direction (i.e., in the +/−Z direction) from the floor surface 202 to an apex A of the piston material, as best shown in FIGS. 5-6. The apex extends in the system vertical direction (i.e., in the +/−Z direction) a height less than the height H of the rim wall 204 in the system vertical direction (i.e., in the +/−Z direction). The center portion 208 may be rounded or circular at the apex A and is configured to assist in directing or guiding the fuel 23, as the spray plume 25 (FIG. 7), and as discussed in greater detail herein.

A plurality of protrusions 210 extend radially from the center portion 208. Each of the plurality of protrusions 210 extend across and/or from the floor surface 202. Further, each of the plurality of protrusions 210 are spaced apart such that a spray guide 212 is formed between each of the spaced apart plurality of protrusions 210. In some embodiments, each of the spaced apart plurality of protrusions 210 are an elliptic-lanceolate shape. That is, each of the plurality of protrusions 210 have a starting portion 213 and the terminating portion 214 with a body portion 216 positioned there between. The starting portion 213 begins or terminates at the center portion 208. The terminating portion 214 terminates at the floor surface 202 spaced apart from the starting portion 213 and/or the center portion 208. The body portion 216 has a width W greater than a width W2 of the starting portion 213 and a width W3 of the terminating portion 214. Further, the width W2 of the starting portion 213 is less than the width W3 of the terminating portion 214.

In other embodiments, each of the plurality of protrusions 210 are a general lancolate shape. That is, the width W of the body portion 216 is greater than the width W2 of the starting portion 213 and the width W3 of the terminating portion 214. Further, the width W2 of the starting portion 213 and the width W3 of the terminating portion 214 are similar or equal. In yet other embodiments, each of the plurality of protrusions 210 may be a same shape, a different shape, and/or a combination thereof. Further, each of the plurality of protrusions 210 may be a uniform shape with symmetry such as a rectangle, ellipses, square, hexagon, and the like, or may be irregular shapes. Further, in other embodiments, the width W2 of the starting portion 213 may be greater than the width W3 of the terminating portion 214, the width W2 of the starting portion 213 and/or the width W3 of the terminating portion 214 may be greater than the width W of the body portion 216, and/or the like.

Further, the body portion 216 and the starting portion 213 each have an upper surface 217a, 217b that are each positioned above an upper surface 215 of the terminating portion 214 in the system vertical direction (i.e., in the +/−Z direction) so to have a slope. In some embodiments, the upper surface 217a of the starting portion 213 is positioned above the upper surface 217b of the body portion 216 in the system vertical direction (i.e., in the +/−Z direction) so to have a continuous slope or a continuous taper in the system vertical direction (i.e., in the +/−Z direction) from the center portion 208 to the terminating portion 214 and the floor surface 202. In other embodiments, portions of the upper surface 217b of the body portion 216 is positioned above the upper surface 217a of the starting portion 213 in the system vertical direction (i.e., in the +/−Z direction) so to have an intermittent downward slope or an intermittent downward taper in the system vertical direction (i.e., in the +/−Z direction) towards the terminating portion 214 and/or the floor surface 202.

Still referring to FIGS. 2-7, each spray guide 212 formed between each of the spaced apart plurality of protrusions 210 may take, at least partially, the shape of at least a portion of the body portion 216 and/or the starting portion 213 of the plurality of protrusions 210. Each spray guide 212 formed between each of the spaced apart plurality of protrusions 210 includes a guide starting portion 218 and a guide terminating portion 220 that is spaced apart from the guide starting portion 218 and/or the center portion 208. In some embodiments, each spray guide 212 formed between each of the spaced apart plurality of protrusions 210 and is positioned below the upper surface 217a of the starting portion 213 and the upper surface 217b of the body portion 216 in the system vertical direction (i.e., in the +/−Z direction). Further, in some embodiments, each spray guide 212 may have a greater slope downward towards the floor surface 202 in the system vertical direction (i.e., in the +/−Z direction) than the slope of the upper surface 217a of the starting portion 213 and/or than the slope of the upper surface 217b of the body portion 216.

In other embodiments, portions of each spray guide 212 may have a greater slope downward towards the floor surface 202 the system vertical direction (i.e., in the +/−Z direction) than the slope of the upper surface 217a of the starting portion 213 and/or than the slope of the upper surface 217b of the body portion 216.

In some embodiments, the guide starting portion 218 of each spray guide 212 begins or starts at the center portion 208 between each upper surface 217a of the starting portion 213 of each of the plurality of protrusions 210. As such, the guide starting portion 218 is initially below the upper surface 217a of each of the plurality of protrusions 210 to receive a portion of the fuel 23 (i.e., each leg of the spray plume 25) injected into the piston bowl 118 and makes contact with the center portion 208. The guide terminating portion 220 is positioned closer to the rim wall 204 than the guide starting portion 218. Further, the guide terminating portion 220 is positioned below the guide starting portion 218 in the system vertical position (i.e., in the +/−Z direction). The guide starting portion 218 is fluidly coupled to the guide terminating portion 220 by a guide body 222.

The guide body 222 is also sloped with reference to the floor surface 202. As such, in some embodiments, the spray guide 212 is sloped with respect to the floor surface 202 in the system vertical direction (i.e., in the +/−Z direction) so to have a continuous slope or a continuous taper in the system vertical direction (i.e., in the +/−Z direction) from the center portion 208 to the guide terminating portion 220 and the floor surface 202.

As such, the spray guide 212 receives the fuel 23 when injected into the piston bowl 118 and directs the fuel 23 (i.e., each leg of the spray plume 25 and other fluids, such as air) to the floor surface 202. In some embodiments, each spray guide 212 is generally a simple polygon shape. That is, the guide starting portion 218, the guide terminating portion 220 and the guide body 222 form a generally shape that include non-intersecting line segments as sides that form a single closed path. In other embodiments, each spray guide 212 may be a complex polygon shape, or any other geometric shape that is configured to receive and guide a fluid from one area to another.

In some embodiments, the guide terminating portion 220 has a width G1 that is wider than a width G2 of the guide body 222 and a width G3 of the guide starting portion 218. Further, the width G2 of the guide body 222 is greater than the width G3 of the guide starting portion 218. As such, this arrangement allows the fuel 23 and other fluids, such as air, to be received and directed to the floor surface 202 within the spray guide 212 while also maximizing any air volume positioned near or the center portion 208.

In other embodiments, the width G2 of the guide body 222 is greater than the width G2 of the guide terminating portion 220 and the width G3 of the guide starting portion 218. Further, in other embodiments, the width G3 of the guide starting portion 218 and the width G2 of the guide body 222 are similar or equal. In yet other embodiments, each of the spray guides 212 may be a same shape, a different shape, and/or a combination thereof. Further, each of the spray guides 212 may be a uniform shape with symmetry such as a rectangle, ellipses, square, hexagon, and the like, or may be irregular shapes.

Further, in some embodiments, each terminating portion 214 of the plurality of protrusions 210 terminate closer to the rim wall 204 than the guide terminating portion 220 terminates closer to the rim wall 204. In other embodiments, each guide terminating portion 220 of the spray guides 212 terminate closer to the rim wall 204 than the terminating portion 214 terminates of the plurality of protrusions 210.

It should be understood that, in some embodiments, the plurality of protrusions 210 and spray guide 212 are each equally spaced apart and extend radially from the center portion 208 an equal length to form a star shape. Further, in some embodiments, each of the spray guides 212 equally disperse the fuel 23 into a continuous radius portion 226, as discussed in greater detail herein. In other embodiments, each of the spray guides 212 equally disperse the fuel 23 into a continuous radius portion 226, as discussed in greater detail herein. In some embodiments, there are the eight protrusions and eight spray guides 212 extending from the center portion 208 to form the star shape. This is non-limiting and there may more or less protrusions and/or spray guide 212 therebetween.

Still Referring to FIGS. 2-7, a continuous radius portion 226 is formed from the transition of the floor surface 202 and the rim wall 204. The continuous radius portion 226 is positioned beyond the terminating portion 214 of each of the plurality of protrusions 210 and the guide terminating portion 220 of each spray guide 212. As such, the continuous radius portion 226 increases the size of the piston bowl 118 and/or makes increases the deepness of the piston bowl 118 in the system vertical direction (i.e., in the +/−Z direction) and allows for the plurality of protrusions 210 and spray guides 212 to extend radially from the center portion 208 a great length than conventional piston bowl 14 (FIG. 1A). That is, the combination of the continuous radius portion 226, the plurality of protrusions 210 and the spray guide 212 remove the air pocket between sprays using the arrangement of the piston bowl 118, which provides a larger base bowl radius leading to longer free spray length/soot reduction.

The continuous radius portion 226 extends circumferentially beyond the terminating portion 214 of each of the plurality of protrusions 210 and the guide terminating portion 220 of each spray guide 212 and may follow the circumference of the rim wall 204. Portions of the continuous radius portion 226 are position below the terminating portion 214 of each of the plurality of protrusions 210 and/or the guide terminating portion 220 of each spray guide 212 in the system vertical direction (i.e., in the +/−Z direction). As such, the continuous radius portion 226 is configured to receive a fluid (e.g., fuel, air, and the like) from the center portion 208, from the spray guide 212 and/or from the plurality of protrusions 210 that force or direct the fluid into the continuous radius portion 226.

As such, the fluid (e.g., fuel, air, and the like) received from the center portion 208, from the spray guide 212 and/or from the plurality of protrusions 210 into the continuous radius portion 226 permits an unimpeded swirl motion of the fuel and the air volume to occur within the continuous radius portion 226. It should be appreciated that the swirl motion assists in oxidation and a reduction of particulate matters generated within the combustion chamber during the combustion process.

The continuous radius portion 226 is positioned below the upper surface 205 of the rim wall 204 and is spaced apart from the upper surface 205 of the rim wall 204 to form a lip 228 at an upper end 230 of the continuous radius portion 226. The smooth curvature of the continuous radius portion 226 and the lip 228 retain the fuel 23 and other fluid (i.e. air mixture) and permit for the swirl motion of the fuel 23 and other fluid (i.e. air mixture) mixture during compression. It should be appreciated that the swirl motion may be either clockwise or counterclockwise. Further, it should be appreciated that the arrangement of the plurality of protrusions 210 and the spray guides 212 do not interfere with the continuous radius portion 226 such that the swirl motion of fuel 23 and other fluid (i.e. air mixture) during compression may occur unimpeded. Further, the continuous radius portion 226 may be manufactured from the piston bowl 118 using known and typical manufacturing processes. As such, forming the continuous radius portion 226 does not require three-dimensional printing or other complicated manufacturing processes.

Figure 8A:
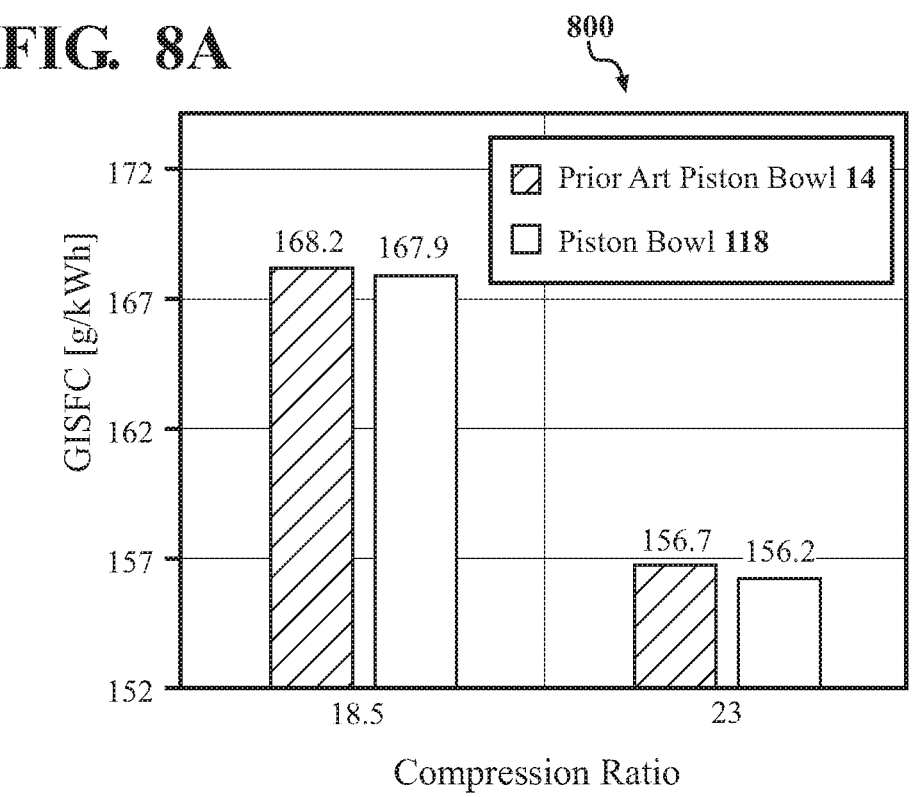
FIG. 8A schematically graphically depicts a Gross Indicated. Specific Fuel Consumption predetermined compression ratios between the prior art piston bowl of the piston of FIG. 1A and the piston bowl of the internal combustion engine system of FIG. 2, according to one or more embodiments described herein.

Now referring to FIG. 8A, a bar graph 800 of a Gross Indicated Specific Fuel Consumption (GISFC) at predetermined compression ratios between the prior art piston bowl 14 (FIG. 1A) and the piston bowl 118 (FIG. 2) during simulations indicating analytical results is graphically depicted. The bar graph 800 graphically depicts that the prior art piston bowl 14 (FIG. 1A), at 18.5 compression ratio, has a GISFC of 168.2 g/kWh and, at a 23 compression ratio, the prior art piston bowl 14 (FIG. 1A) has a GISFC of 156.7 g/kWh. The bar graph 800 graphically depicts that the piston bowl 118 (FIG. 2), at 18.5 compression ratio, has a GISFC of 167.9 g/kWh and, at a 23 compression ratio, the piston bowl 118 (FIG. 2) has a GISFC of 156.2 g/kWh. As such, the piston bowl 118 (FIG. 2) has a lower GISFC at varying compression ratios compared to the prior art piston bowl 14 (FIG. 1A). It should be appreciated that, at the same compression ratio, the arrangement of the piston bowl 118 (FIG. 2) moves the air volume from the center portion 208

(FIG. 3) towards the outer periphery portion 206 (FIG. 3) of the floor surface 202 to achieve better air utilization, GISFC, and a reduction in particulate matters during the combustion process.

Figure 8B:
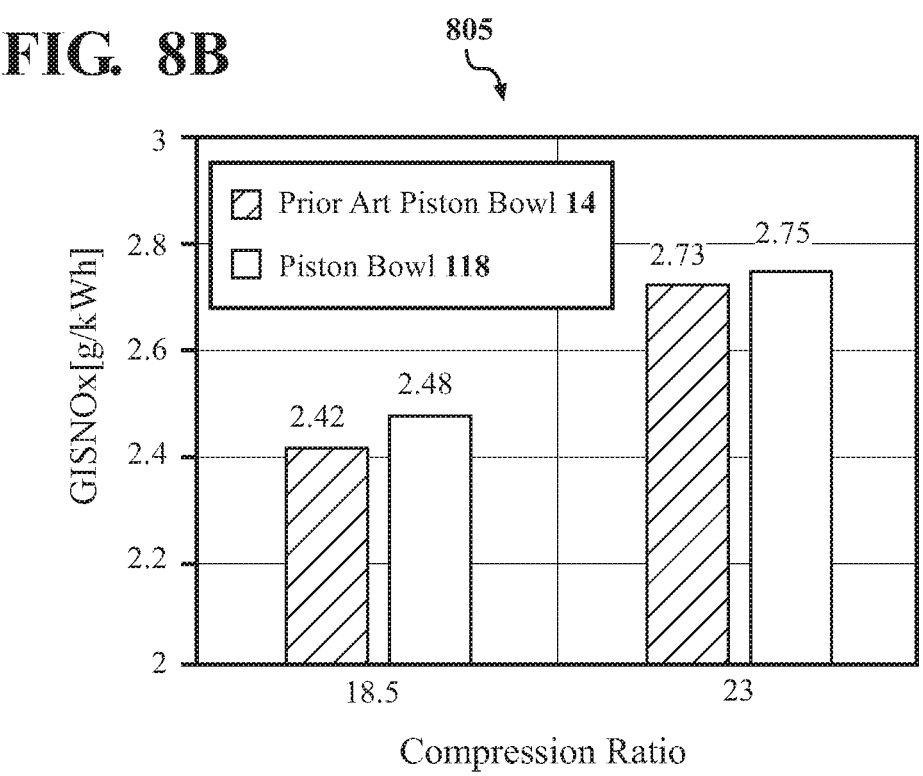
FIG. 8B graphically depicts a bar chart of a Gross indicated Specific Nitrogen Oxides Emissions at predetermined compression ratios between the prior art piston bowl of the piston of FIG. 1A and the piston bowl of the internal combustion engine system of FIG. 2, according to one or more embodiments described herein.

Now referring to FIG. 8B, a bar graph 805 of a Gross Indicated Specific Nitrogen Oxides Emissions (GISNOx) at predetermined compression ratios between the prior art piston bowl 14 (FIG. 1A) and the piston bowl 118 (FIG. 2) during simulations indicating analytical results is graphically depicted. The bar graph 805 graphically depicts that the prior art piston bowl 14 (FIG. 1A), at 18.5 compression ratio, has a GISNOx of 2.42 g/kWh and, at a 23 compression ratio, the prior art piston bowl 14 (FIG. 1A) has a GISNOx of 2.73 g/kWh. The bar graph 805 further graphically depicts that the piston bowl 118 (FIG. 2), at 18.5 compression ratio, has a GISNOx of 2.48 g/kWh and, at a 23 compression ratio, the piston bowl 118 (FIG. 2) has a GISNOx of 2.75 g/kWh. As such, the piston bowl 118 (FIG. 2) has a greater GISNOx at varying compression ratios compared to the prior art piston bowl 14 (FIG. 1A).

Figure 8C:
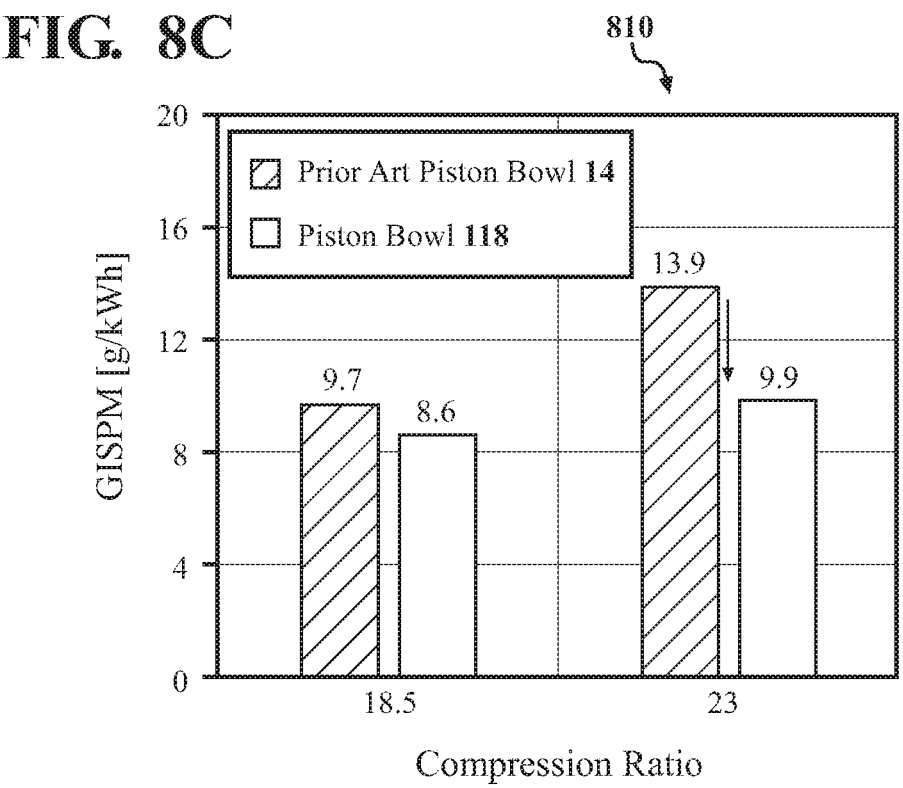
FIG. 8C graphically depicts a bar chart of a Gross Indicated Specific Particulate Matters at predetermined compression ratios between the prior art piston bowl of the piston of FIG. 1A and the piston bowl of the internal combustion engine system of FIG. 2, according to one or more embodiments described herein.
Figure 8D:
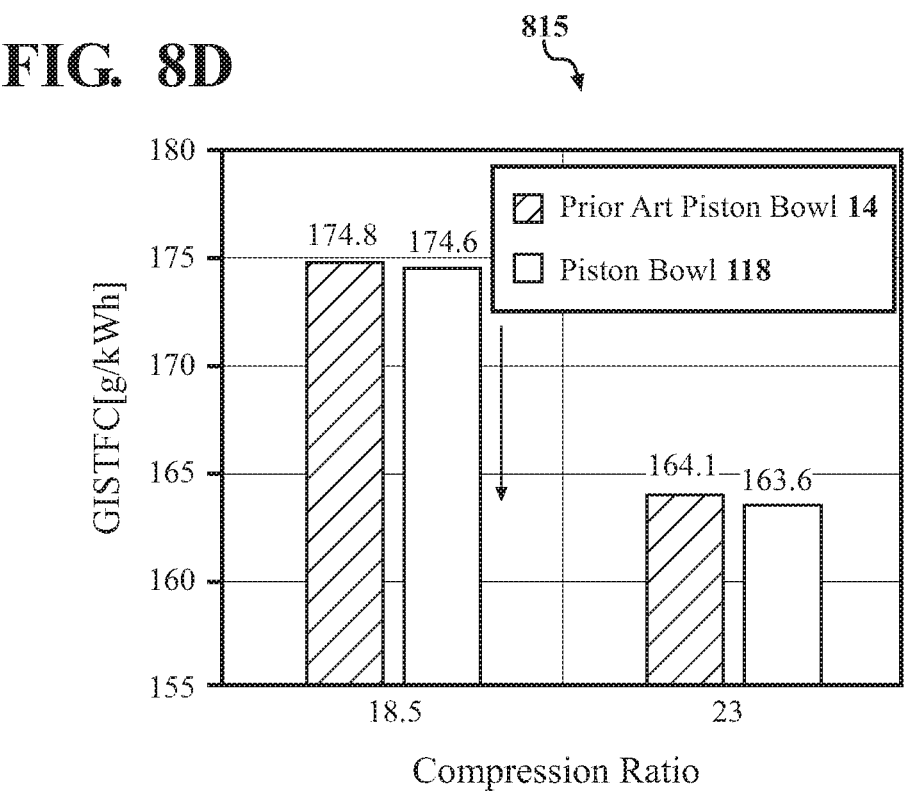
FIG. 8D graphically depicts a bar chart of a Gross Indicated Specific Total Fluid Consumption at predetermined compression ratios between the prior art piston bowl of the piston of FIG. 1A and the piston bowl of the internal combustion engine system of FIG. 2, according to one or more embodiments described herein.

Now referring to FIG. 8C, a bar graph 810 of a Gross Indicated Specific Particulate Matters (GISPM) at predetermined compression ratios between the prior art piston bowl 10 (FIG. 1A) and the piston bowl 118 (FIG. 2) during simulations indicating analytical results is graphically depicted. The bar graph 810 graphically depicts that the prior art piston bowl 14 (FIG. 1A), at 18.5 compression ratio, has a GISPM of 9.7 g/kWh and, at a 23 compression ratio, the prior art piston bowl 14 (FIG. 1A) has a GISPM of 13.29 g/kWh. The bar graph 810 further graphically depicts that the piston bowl 118 (FIG. 2), at 18.5 compression ratio, has a GISPM of 8.6 g/kWh and, at a 23 compression ratio, the piston bowl 118 (FIG. 2) has a GISPM of 9.9 g/kWh. As such, the piston bowl 118 (FIG. 2) has a reduction in GISPM at varying compression ratios compared to the prior art piston bowl 14 (FIG. 1A). Further, it should be understood that the GISPM of the piston bowl 118 (FIG. 2) is similar when compression ratio is changed which indicates that there is no increase in Diesel Particulate Filter (DPF) regeneration frequency Now referring to FIG. 8D, a bar graph 815 of a Gross Indicated Specific Total Fluid Consumption (GISTFC) at predetermined compression ratios between the prior art piston bowl 14 (FIG. 1A) and the piston bowl 118 (FIG. 2) during simulations indicating analytical results is graphically depicted. The bar graph 815 graphically depicts that the prior art piston bowl 14 (FIG. 1A), at 18.5 compression ratio, has a GISTFC of 174.8 g/kWh and, at a 23 compression ratio, the prior art piston bowl 14 (FIG. 1A) has a GISTFC of 164.1 g/kWh. The bar graph 815 further graphically depicts that the piston bowl 118 (FIG. 2), at 18.5 compression ratio, has a GISTFC of 174.6 g/kWh and, at a 23 compression ratio, the piston bowl 118 (FIG. 2) has a GISTFC of 163.6 g/kWh. As such, the piston bowl 118 (FIG. 2) has a reduction in GISTFC at varying compression ratios compared to the prior art piston bowl 14 (FIG. 1A).

As such, it should be understood that based on simulations gathering analytical results, the piston bowl 118 (FIG. 2) has a GISFC benefit with lower particulate matter at high compression ratios (i.e., greater than 21) without an injection spray optimization. Further, the piston bowl 118 (FIG. 2) indicates a reduction in GISFC by increasing the compression ratio from 18.5 to 23 while maintaining similar soot baselines. As such, the GISFC benefit is due to the arrangement of the plurality of protrusions 210, the spray guide 212, and the continuous radius portion 226 of piston bowl 118 (FIG. 2), which promotes a lower heat transfer and better utilization of the air volume (i.e., removal of an air pocket between sprays by the piston bowl 118 having a larger base bowl radius, leading to longer free spray length/soot reduction), and swirl motion within the piston bowl 118 compared to the prior art piston bowl 14 (FIG. 1A).

Further, it should be appreciated that thermal efficiency increases with compression ratio, engine out particulate matter emissions also increase due to smaller piston bowl volume, similar to the prior art piston bowl 14 (FIG. 1A). As such, this can lead to shorter DPF regeneration intervals, which may ultimately offset the fuel consumption benefit of high compression ratio. The geometric arrangement of the piston bowl 118 offsets the tradeoff between compression ratio and particulate matter generation.

Figure 9A:
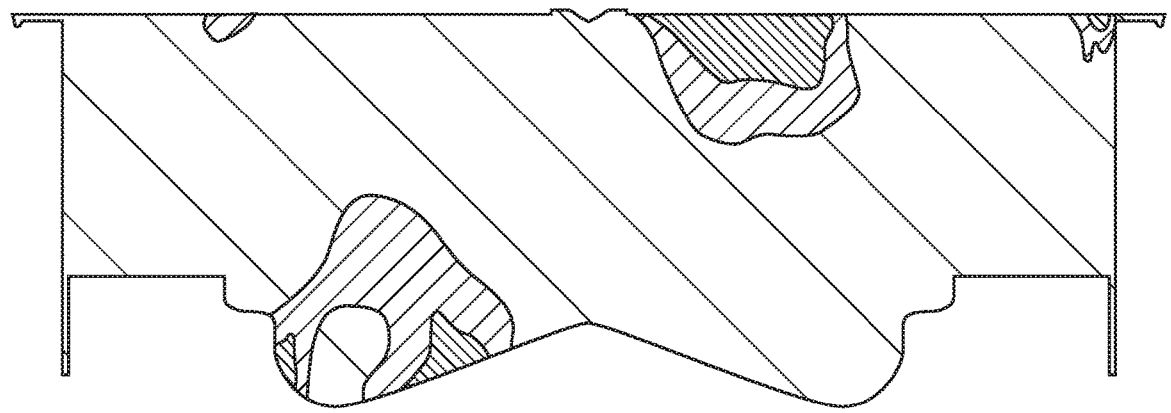
FIG. 9A graphically depicts soot build up regions of the prior art piston bowl of FIG. 1A, according to one or more embodiments described herein.

Now referring to FIG. 9A a soot buildup in the prior art piston bowl 14 (FIG. 1A) is graphically illustrated. As illustrated there are multiple instances and large sized high soot build up within the piston bowl 14 (FIG. 1A). For example, there are at least two instances of a soot buildup greater than 3.00 e-04 mass fraction.

Figure 3:
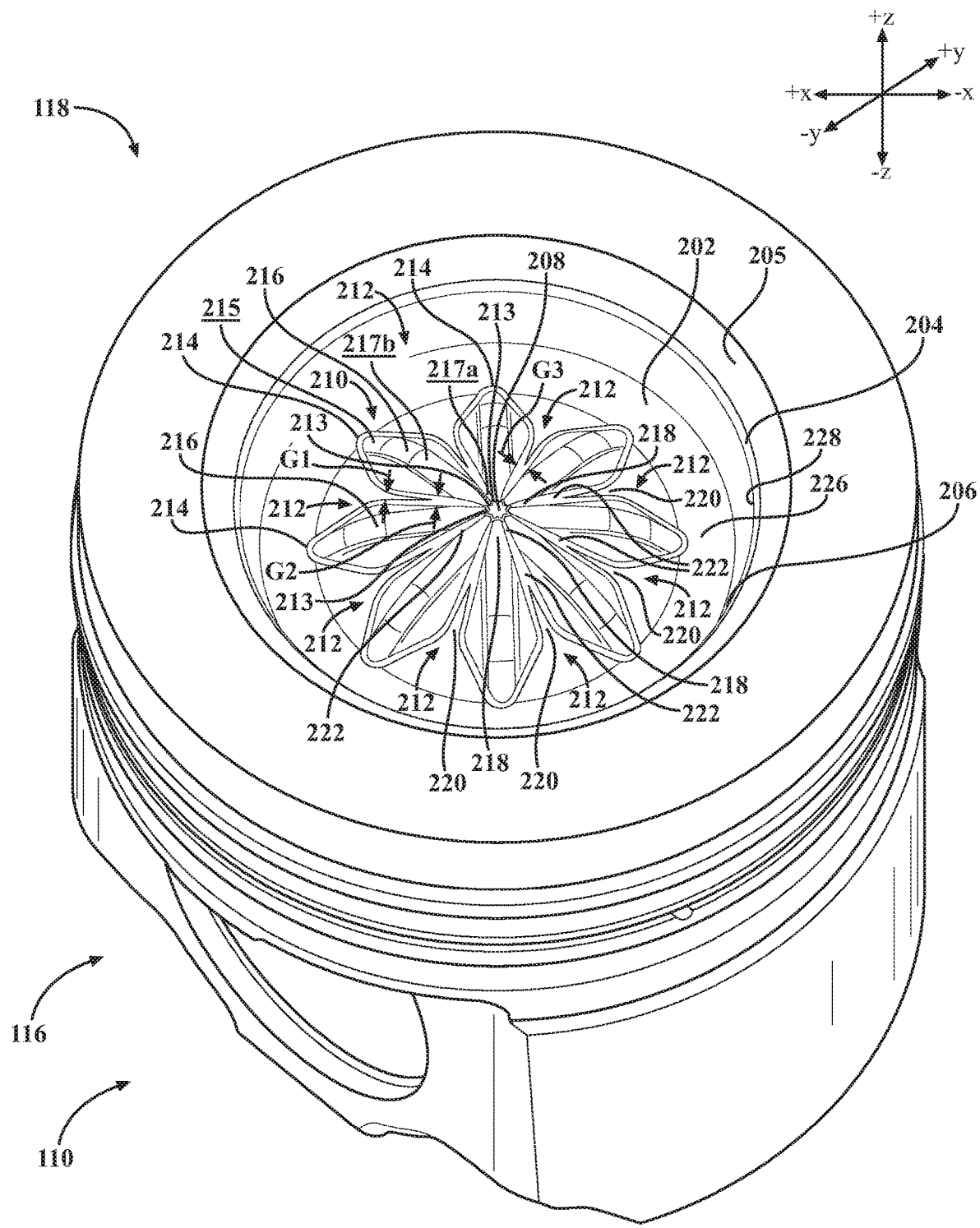
FIG. 3 schematically depicts a partial isolated perspective view of a piston bowl of the internal combustion engine system of FIG. 2, according to one or more embodiments shown and described herein.
Figure 4:
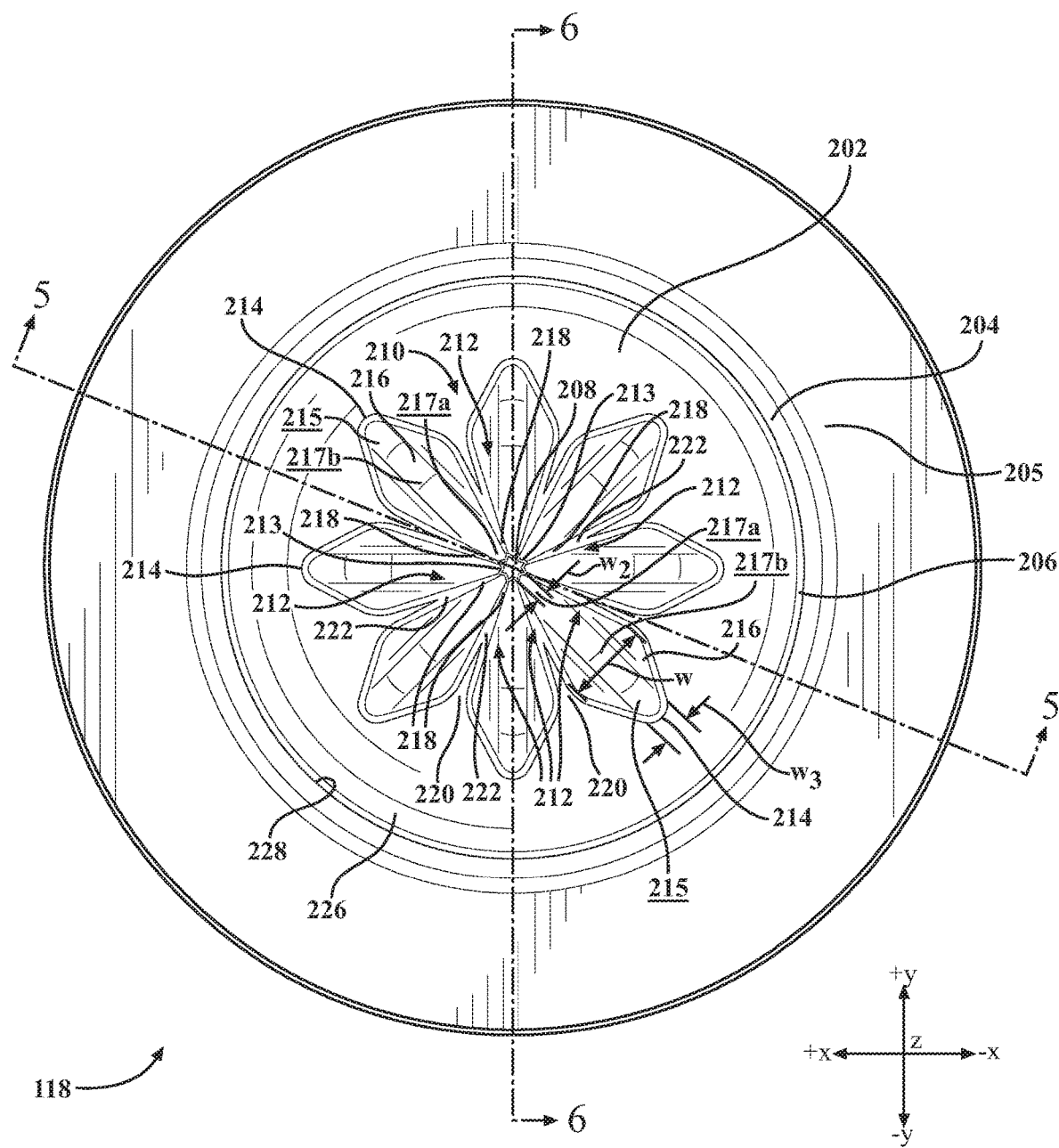
FIG. 4 schematically depicts a top view of the piston bowl of the internal combustion engine system of FIG. 2, according to one or more embodiments shown and described herein.
Figure 9B:
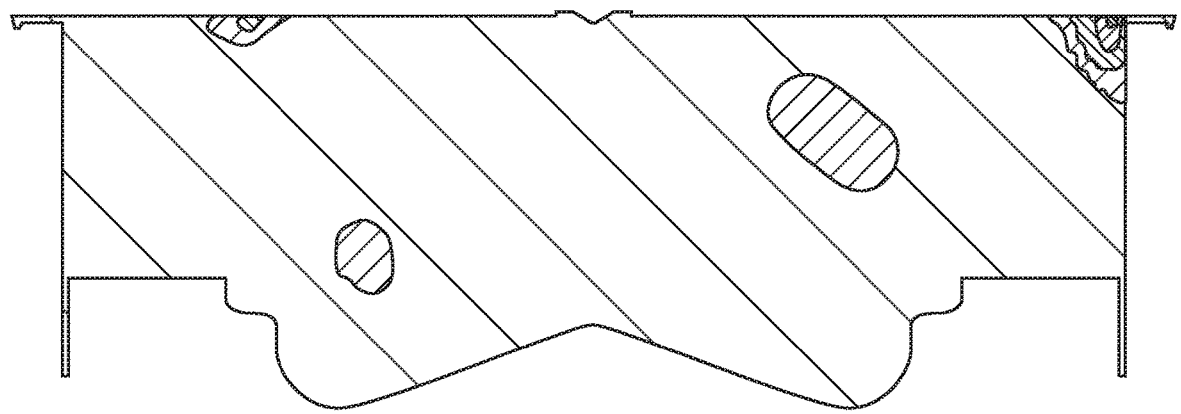
FIG. 9B graphically depicts soot build up regions of the piston bowl of the internal combustion engine system of FIG. 2, according to one or more embodiments described herein.

Now referring to FIG. 9B, a soot build up in the piston bowl 118 (FIG. 3) is graphically illustrated. As illustrated there is a reduction in the number of instances of high soot build up and the size thereof within the piston bowl 118 (FIG. 3).

It should be appreciated that the geometry of the piston bowl described herein reduces and/or eliminates the air pocket between the spray plumes by adding piston material while still utilizing the swirl motion for fuel air mixing. As such, this arrangement of the piston bowl provides for reduced particulate material emissions in high compression ratios in direct injection applications compared to conventionally known piston bowls by providing an increased bowl volume due to the size of the continuous radius portion, increasing a length from the center portion to the continuous radius portion via the plurality of protrusions and spray guides, and the continuous radius is unimpeded so that a swirl motion of the fuel may occur in the continuous radius portion.

As such, the arrangement of the piston bowl guides or directs the spray plume into areas with higher air density, such as the continuous radius portion and the swirl, or air motion continues fuel mixing as the fuel plume comes outside of the bowl later during combustion. Also, a higher fuel plume and rim wall interaction will lead to higher heat rejection while swirl motion can continue to mix fuel plume and air without necessarily having an interaction with rim wall.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A piston for an internal combustion engine, the piston comprising:
   a piston bowl defined by a floor surface and a rim wall extending from an outer periphery of the floor surface in a system vertical direction to circumferential surround the floor surface, the piston bowl further including:
      a center portion that extends above the floor surface in the system vertical direction to an apex,
      a plurality of protrusions extending radially from the center portion and from the floor surface, each of the plurality of protrusions having a starting portion, a terminating portion and an upper surface thereon, the upper surface of the plurality of protrusions is positioned below the apex in the system vertical direction, each of the plurality of protrusions are spaced apart such that a spray guide is formed between each of the spaced apart plurality of protrusions, each spray guide has a guide starting portion extending radially from the center portion and is positioned below the upper surface of the starting portion of the plurality of protrusions and the apex in the system vertical direction, each of the plurality of protrusions and spray guides are tapered so to terminate prior to the rim wall such that a continuous radius portion is formed from a portion of the rim wall and a portion of the floor surface beyond a respective terminating portion of each of the plurality of protrusions and the spray guides,
      wherein at least a portion of the fuel is directed into and travels within each guide starting portion of the spray guide formed between each of the spaced apart plurality of protrusions and such that the spray guides direct the at least a portion of fuel into the continuous radius portion.

2. The piston of claim 1, wherein the center portion includes an apex extending from the floor surface in the system vertical direction.

3. The piston of claim 2, wherein the apex of the center portion is positioned below an upper surface of the rim wall in the system vertical direction.

4. The piston of claim 1, wherein each respective terminating portion of each protrusion of the plurality of protrusions terminate into the floor surface closer to the rim wall than each respective terminating portion of the spray guides.

5. The piston of claim 1, wherein each of the plurality of protrusions and each of the spray guides move an air volume and the fuel from the center portion towards the rim wall to have increased air utilization in a combustion process.

6. The piston of claim 5, wherein the arrangement of the plurality of protrusions and the spray guides permits a swirl motion of the fuel and the air volume to occur within the continuous radius portion.

7. The piston of claim 6, wherein the swirl motion assists in oxidation and a reduction of particulate matters generated within a combustion chamber.

8. The piston of claim 1, wherein each of the plurality of protrusions are equally spaced apart and extend radially from the center portion an equal length to form a star shape.

9. The piston of claim 1, wherein each of the spray guides receive a portion of the fuel to equally disperse the fuel into the continuous radius portion.

10. The piston of claim 1, wherein:
   the piston is movable between a top dead center position and a bottom dead center position to change a volume of a combustion chamber such that the fuel is dispersed into the combustion chamber at a predefined interval of movement of the piston, the fuel impinges the center portion and at least a portion of each of the plurality of protrusions such that a portion of the fuel enters into each of the spray guides and is directed into the continuous radius portion such that a swirl motion of the fuel occurs and the fuel is ignited within the combustion chamber at a compression ratio above 21 and without an increase in a particulate matter emissions.

* * * * *